United States Patent
Hall et al.

(10) Patent No.: US 11,118,106 B2
(45) Date of Patent: Sep. 14, 2021

(54) RHEOLOGY CONTROL OF NANOCELLULOSE TREATMENT FLUIDS

(71) Applicant: Halliburton Energy Services, Inc., Houston, TX (US)

(72) Inventors: Lee J. Hall, The Woodlands, TX (US); Carlos L. Salas, Raleigh, NC (US); Orlando J. Rojas, Cary, NC (US)

(73) Assignee: Halliburton Energy Services, Inc., Houston, TX (US)

( * ) Notice: Subject to any disclaimer, the term of this patent is extended or adjusted under 35 U.S.C. 154(b) by 76 days.

(21) Appl. No.: 16/349,542

(22) PCT Filed: Dec. 20, 2017

(86) PCT No.: PCT/US2017/067672
§ 371 (c)(1),
(2) Date: May 13, 2019

(87) PCT Pub. No.: WO2019/125441
PCT Pub. Date: Jun. 27, 2019

(65) Prior Publication Data
US 2020/0263081 A1  Aug. 20, 2020

(51) Int. Cl.
*C09K 8/90* (2006.01)
*C09K 8/035* (2006.01)
(Continued)

(52) U.S. Cl.
CPC ............... *C09K 8/90* (2013.01); *C09K 8/035* (2013.01); *D21B 1/021* (2013.01); *D21B 1/063* (2013.01);
(Continued)

(58) Field of Classification Search
None
See application file for complete search history.

(56) References Cited

U.S. PATENT DOCUMENTS 6,348,436 B1 * 2/2002 Langlois ............... B82Y 5/00
507/112
9,133,384 B2 9/2015 Rincon-Torres et al.
(Continued)

FOREIGN PATENT DOCUMENTS

WO  2016099534 A1  6/2016
WO  2016099537 A1  6/2016

OTHER PUBLICATIONS

Klemm, D., et al. "Nanocelluloses: A New Family of Nature-Based Materials", Angew. Chem. Int. Ed., 50: 5438-5466. (2011).
(Continued)

*Primary Examiner* — John J Figueroa
(74) *Attorney, Agent, or Firm* — McGuireWoods LLP (57) ABSTRACT

Included are methods and systems for controlling the rheology of a treatment fluid. An example method comprises selecting a cellulose feedstock source to provide a cellulose capable of being processed into a nanocellulose having an average desired aspect ratio, and processing the cellulose with a cellulose processing technique to provide the nanocellulose with the average desired aspect ratio. The method further comprises adding the nanocellulose to the treatment fluid; wherein the nanocellulose alters a rheological property of the treatment fluid to provide an altered treatment fluid, and introducing the altered treatment fluid into a wellbore.

17 Claims, 6 Drawing Sheets

(51) Int. Cl.
*D21B 1/02* (2006.01)
*D21B 1/06* (2006.01)
*D21B 1/14* (2006.01)
*B82Y 40/00* (2011.01)

(52) U.S. Cl.
CPC ............... *D21B 1/14* (2013.01); *B82Y 40/00* (2013.01); *C09K 2208/10* (2013.01)

(56) References Cited

U.S. PATENT DOCUMENTS

| | | |
|---|---|---|
| 2013/0035263 A1 | 2/2013 | Laukkanen et al. |
| 2014/0238677 A1 | 8/2014 | Hall |
| 2015/0072902 A1* | 3/2015 | Lafitte .................. C09K 8/44 507/112 |
| 2015/0232703 A1* | 8/2015 | Nelson .................. C08L 97/005 435/99 |
| 2015/0368541 A1* | 12/2015 | Monclin .................. C09K 8/64 507/108 |
| 2016/0160106 A1 | 6/2016 | Jamison et al. |
| 2016/0230066 A1 | 8/2016 | Weaver, Jr. et al. |
| 2017/0145285 A1* | 5/2017 | Lafitte .................. C09K 8/5758 |
| 2017/0183554 A1* | 6/2017 | Monclin .................. C09K 8/62 |
| 2017/0210826 A1* | 7/2017 | Nelson ................ C08B 37/0057 |
| 2017/0253786 A1 | 9/2017 | Hall et al. |
| 2017/0341979 A1 | 11/2017 | Hall et al. |

OTHER PUBLICATIONS

Abdul Khalil, H.P.S, et al. "Green composites from sustainable cellulose nanofibrils: A review", Carbohydrate Polymers, 87(2): 963-979, 2012.
Peng, B.L., et al. "Chemistry and applications of nanocrystalline cellulose and its derivatives: A nanotechnology perspective" Canadian Journal of Chemical Engineering, 89(5): 1191-1206, Oct. 2011.
Habibi, Y., et al. "Cellulose Nanocrystals: Chemistry, Self-Assembly, and Applications", Chem. Rev. 110(6): 3479-3500, 2010.
International Search Report and Written Opinion dated Sep. 19, 2018; International PCT Application No. PCT/US2017/067672.

* cited by examiner

RHEOLOGY CONTROL OF NANOCELLULOSE TREATMENT FLUIDS

TECHNICAL FIELD

The present disclosure relates to controlling the rheology of a treatment fluid with a nanocellulose, and more particularly, to selecting a nanocellulose source and processing technique to provide a nanocellulose with a specific aspect ratio sufficient to impart a desired rheology to a treatment fluid.

BACKGROUND

Treatment fluids can be employed in a variety of subterranean operations. A fluid's rheology is a description of the fluid's properties under shear. In addition to shear, the temperature, pressure, and time may also affect a fluid's rheology. A fluid's rheology affects how the fluid will function in a wellbore operation and how it may interact with other treatment fluids, wellbore fluids, and even the formation. For example, a drilling fluid may be used to carry cuttings out of the wellbore and to the surface where they may be removed. The drilling fluid must be sufficiently viscous in order to carry the cuttings to the surface; otherwise, the cuttings may not be removed from the wellbore and may become trapped or lodged in the wellbore. As another example, a fracturing fluid must be sufficiently viscous for carrying proppant to the fracture while reducing fluid friction as the fluid flows through conduits and pumps at high pressure.

One way to alter a fluid's rheology may be to add additives to the fluid to adjust a specific rheological property such as viscosity. However, many of these additives may break down in brines or at high temperatures, producing a treatment fluid, which may lose its desirable rheological characteristics over time or under certain conditions in the wellbore. Moreover, many of these additives are simply added to the treatment fluid until the desired threshold for the rheological property is achieved. This may result in waste of the additive or interference with other rheological properties and affect the overall rheological profile of the treatment fluid.

Utilizing a treatment fluid having a desired rheology is important for a wellbore operation. Failure to use a treatment fluid with the desired rheology may result in the wellbore operation failing or the need for additional expenditures to mitigate the inefficiencies in the operation.

BRIEF DESCRIPTION OF THE DRAWINGS

Illustrative examples of the present disclosure are described in detail below with reference to the attached drawing figures, which are incorporated by reference herein, and wherein.

The illustrated figures are only exemplary and are not intended to assert or imply any limitation with regard to the environment, architecture, design, or process in which different examples may be implemented.

DETAILED DESCRIPTION

The present disclosure relates to controlling the rheology of a treatment fluid with a nanocellulose, and more particularly, to selecting a nanocellulose source and processing technique to provide a nanocellulose with a specific aspect ratio sufficient to impart a desired rheology to a treatment fluid.

Unless otherwise indicated, all numbers expressing quantities of ingredients, properties such as molecular weight, reaction conditions, and so forth used in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the examples of the present invention. At the very least, and not as an attempt to limit the application of the doctrine of equivalents to the scope of the claim, each numerical parameter should at least be construed in light of the number of reported significant digits and by applying ordinary rounding techniques. It should be noted that when "about" is at the beginning of a numerical list, "about" modifies each number of the numerical list. Further, in some numerical listings of ranges some lower limits listed may be greater than some upper limits listed. One skilled in the art will recognize that the selected subset will require the selection of an upper limit in excess of the selected lower limit.

Treatment fluids can be employed in a variety of subterranean operations. As used herein the terms "treatment," "treating," and other grammatical equivalents thereof refer to any subterranean operation that uses a fluid in conjunction with performing a desired function and/or for achieving a desired purpose. The terms "treatment," "treating," and other grammatical equivalents thereof do not imply any particular action by the fluid or any component thereof. Example treatment fluids may include, for example, drilling fluids, fracturing fluids, cements, workover fluids, completion fluids, and the like.

Examples of the methods and systems described herein relate to controlling the rheology of a treatment fluid with a nanocellulose. The examples described herein comprise the use of nanocellulose. The nanocellulose source and processing technique are selected to provide nanocellulose nanofibrils and/or nanocrystals with desirable surface chemistries and mechanical properties to impart a desired rheology to a treatment fluid. One of the many potential advantages of the disclosed methods and systems is that the nanocellulose may be efficiently used to alter the rheological profile of the treatment fluid as desired and with minimum use of the nanocellulose. Another potential advantage of the disclosed methods and systems is that the nanocellulose may be modified to optimize a rheological property as desired to provide a specific result to a treatment fluid. Yet a further advantage of the disclosed methods and systems is that the nanocellulose is temperature and pressure stable for most wellbore environments and may maintain the desired rheological profile throughout the useful life of the treatment fluid. One more additional advantage is that the disclosed methods and systems utilize cellulose that may be obtained from a large variety of feedstocks for a minimum cost.

Cellulose nanofibrils and nanocrystals may be produced from breaking down macroscopic cellulose fibers with a suitable processing technique. Cellulose nanocrystals comprise a crystalline, rod-like component which is insoluble in water. Cellulose nanocrystals, hereafter "CNC," may also comprise some non-crystalline parts, which have been referred to as amorphous or para-crystalline cellulose. Cellulose nanofibrils, hereinafter "CNF," are nanofibrils varying in length in the range from less than 1 micron (1,000 nm) to several micrometers. The width of the nanofibrils varies in the range of about tens of nm to about 100 nm. The selection of the processing technique may determine whether the nanocellulose comprises nanocrystals, nanofibrils, or a combination thereof. For example, nanofibrils may be formed from the mechanical deconstruction of macroscopic cellulose fibers. Optionally, the mechanical deconstruction may occur with enzymatic or chemical treatments. Nanocrystals may be formed from chemical treatments such as acid hydrolysis or enzymatic reactions. Optionally, the chemical treatment may occur with mechanical deconstruction techniques.

The nanocellulose may affect the rheological profile of a treatment fluid through at least two potential mechanisms. A high-surface area may lead to an increased number of hydrogen bonding per unit volume of the material. The nanocellulose may have increased contact with its neighboring fibers resulting in further hydrogen bonding and/or mechanical entanglement as the fluid reaches its percolation threshold.

The nanocellulose may be produced from any selected cellulose feedstock source. General examples of these feedstocks include plant and bacterial cellulose. Specific examples of plants used as cellulose feedstock sources may include, but are not limited to, cotton, wood and wood pulp, ramie, sisal or any combination thereof. Other examples of algae and sea animal sources include valonia and tunicates, respectively. Specific examples of bacteria used as cellulose feedstock sources include bacteria species of genera: *Enterobacter, Acetobacter, Achromobacter, Agrobacterium, Alacaligenes, Azotobacter, Komagataeibacter, Pseudomonas, Rhizobium, Sarcina, Gluconacetobacter*, or any combination thereof. Feedstock sources for the cellulose can also include processed plant matter including, but not limited to recycled paper, pulp and paper industry streams and residual or waste materials from agro-forest processing. The feedstock is chosen to provide a cellulose that may be processed into a nanocellulose having specific desired properties. Bacterial cellulose has a finer and more intricate structure with a longer fiber length and is stronger and wider than plant cellulose. Bacterial cellulose is also more water-absorbent per unit volume than plant cellulose. Among the individual feedstock species of plants or bacteria, the feedstock chosen may provide a cellulose that is structurally different from the cellulose of other feedstock species within the same kingdom. For example, the cellulose obtained from sisal may be longer than the cellulose obtained from ramie; however, the cellulose obtained from ramie may be wider than the cellulose obtained from sisal. The source of the cellulose feedstock source is selected such that the produced nanocellulose has the properties necessary to impart a desirable rheological property or profile to a specific treatment fluid. The selection of the cellulose feedstock source may be based on the measured average aspect ratio of the cellulose produced from the cellulose feedstock source or any other properties of the cellulose. For example, if two sources of cellulose feedstock are available, ramie and sisal, the aspect ratio of the cellulose samples are measured. If the adjustment of the viscosity of a treatment fluid is the desired rheological property, for example, if the treatment fluid is desired to be more viscous, the cellulose with the larger aspect ratio may be selected as it may be used to produce a nanocellulose with a greater length-to-diameter ratio and may have more surface area and form a greater number of physical connections leading to increased viscosity in the fluid. If a lesser increase in viscosity is desired, the other cellulose may be chosen if they would result in a nanocellulose with a lesser aspect ratio that would provide a smaller increase in viscosity.

As such, the feedstock source of the cellulose may be used to provide a nanocellulose having sufficient properties to provide a treatment fluid with a desired rheology. With the benefit of this disclosure, one of ordinary skill in the art will be readily able to determine and select a cellulose feedstock source that is capable of being processed into a desired nanocellulose source.

The nanocellulose may be produced from the cellulose via any sufficient processing technique. The properties of the nanocellulose are a factor of the cellulose feedstock source and the processing technique used to process the cellulose into the nanocellulose. The processing technique may be any mechanical or chemical processing technique used to process cellulose into nanocellulose. The chosen processing technique also determines whether the nanocellulose is formed into nanocrystals, nanofibrils, or a combination thereof. Examples of mechanical processing techniques include, but are not limited to, cryo-crushing, cryo-milling, grinding, fluid homogenization, microfluidization, aqueous counter-collision, shearing, or any combination thereof. Examples of chemical processing techniques include, but are not limited to, contacting with acids, bases, oxidizing agents, enzymes, or any combination thereof to the cellulose. The mechanical and chemical processing techniques may be used to break down the cellulose into the nanocellulose. In some examples, both mechanical and chemical processing techniques may be used. In some examples, the nanocellulose may be chemically modified by the chosen chemical processing technique. For example, the nanocellulose may be chemically modified by carboxylation, carboxymethylation, oxidation, introduction of substituted silyl groups (silylation), amination to add a quaternary amine functional group, addition of cationic functional groups, grafting of a second nanocellulose onto the first nanocellulose, or any combination thereof. The chemical modification may also comprise the grafting of one or more other polymers onto the nanocellulose. The other polymer may comprise substituted methyl cellulose; chitosan; chitin; cationic polyelectrolytes containing primary, secondary, tertiary or quaternary amino groups, including cationic polyacrylamides (hereafter "CPAMs"), cationic starch, poly (diallyldimethyl ammonium chloride), or epichlorohydrin/dimethylamine polymers; nonionic or anionic polymers, including polyethylene glycol or lignins; or any combinations thereof. The chemical modification may create a negative or positive surface charge as desired. The type of chemical modification (e.g., oxidation or carboxymethylation) can affect the rheological properties of the treatment fluid. The type of chemical modification may be selected to provide the desired properties to the nanocellulose.

The nanocellulose may be added to a treatment fluid that is introduced into a wellbore in any sufficient concentration. The concentration of the nanocellulose in the treatment fluid may range from about 0.1% (V/V) of the treatment fluid to about 20% (V/V) of the treatment fluid. The concentration of the nanocellulose in the treatment fluid may range from any lower limit to any upper limit and encompass any subset between the upper and lower limits. Some of the lower limits listed may be greater than some of the listed upper limits. One skilled in the art will recognize that the selected subset may require the selection of an upper limit in excess of the selected lower limit. Therefore, it is to be understood that every range of values is encompassed within the broader range of values. For example, the concentration of the nanocellulose in the treatment fluid may range from about 0.1% (V/V) to about 20% (V/V) of the treatment fluid, may range from about 0.5% (V/V) to about 20% (V/V) of the treatment fluid, may range from about 1% (V/V) to about 20% (V/V) of the treatment fluid, may range from about 2% (V/V) to about 20% (V/V) of the treatment fluid, may range from about 3% (V/V) to about 20% (V/V) of the treatment fluid, may range from about 4% (V/V) to about 20% (V/V) of the treatment fluid, may range from about 5% (V/V) to about 20% (V/V) of the treatment fluid, may range from about 6% (V/V) to about 20% (V/V) of the treatment fluid, may range from about 7% (V/V) to about 20% (V/V) of the treatment fluid, may range from about 8% (V/V) to about 20% (V/V) of the treatment fluid, may range from about 9% (V/V) to about 20% (V/V) of the treatment fluid, may range from about 10% (V/V) to about 20% (V/V) of the treatment fluid, may range from about 11% (V/V) to about 20% (V/V) of the treatment fluid, may range from about 12% (V/V) to about 20% (V/V) of the treatment fluid, may range from about 13% (V/V) to about 20% (V/V) of the treatment fluid, may range from about 14% (V/V) to about 20% (V/V) of the treatment fluid, may range from about 15% (V/V) to about 20% (V/V) of the treatment fluid, may range from about 16% (V/V) to about 20% (V/V) of the treatment fluid, may range from about 17% (V/V) to about 20% (V/V) of the treatment fluid, may range from about 18% (V/V) to about 20% (V/V) of the treatment fluid, or may range from about 19% (V/V) to about 20% (V/V) of the treatment fluid. As another example, the concentration of the nanocellulose in the treatment fluid may range from about 0.1% (V/V) to about 19% (V/V) of the treatment fluid, may range from about 0.1% (V/V) to about 18% (V/V) of the treatment fluid, may range from about 0.1% (V/V) to about 17% (V/V) of the treatment fluid, may range from about 0.1% (V/V) to about 16% (V/V) of the treatment fluid, may range from about 0.1% (V/V) to about 15% (V/V) of the treatment fluid, may range from about 0.1% (V/V) to about 14% (V/V) of the treatment fluid, may range from about 0.1% (V/V) to about 13% (V/V) of the treatment fluid, may range from about 0.1% (V/V) to about 12% (V/V) of the treatment fluid, may range from about 0.1% (V/V) to about 11% (V/V) of the treatment fluid, may range from about 0.1% (V/V) to about 10% (V/V) of the treatment fluid, may range from about 0.1% (V/V) to about 9% (V/V) of the treatment fluid, may range from about 0.1% (V/V) to about 8% (V/V) of the treatment fluid, may range from about 0.1% (V/V) to about 7% (V/V) of the treatment fluid, may range from about 0.1% (V/V) to about 6% (V/V) of the treatment fluid, may range from about 0.1% (V/V) to about 5% (V/V) of the treatment fluid, may range from about 0.1% (V/V) to about 4% (V/V) of the treatment fluid, may range from about 0.1% (V/V) to about 3% (V/V) of the treatment fluid, may range from about 0.1% (V/V) to about 2% (V/V) of the treatment fluid, may range from about 0.1% (V/V) to about 1% (V/V) of the treatment fluid, or may range from about 0.1% (V/V) to about 0.5% (V/V) of the treatment fluid. It is to be understood that the above ranges encompass every range or subset of ranges in-between. With the benefit of this disclosure, one of ordinary skill in the art will be readily able to obtain and prepare a treatment fluid comprising the nanocellulose for a given application.

The cellulose feedstock and processing technique for the nanocellulose may be chosen to provide a nanocellulose capable of altering a desired rheological property of a treatment fluid. Example rheological properties that may be altered by the nanocellulose include, but are not limited to, viscosity, viscoelasticity, yield point, consistency factor, flow index, gelation, or any combination thereof.

The cellulose may be added to a treatment fluid and introduced into a wellbore to perform a wellbore operation. Examples of treatment fluids include, but are not limited to, drilling fluids, drill-in fluids, packer fluids, completion fluids, spacer fluids, workover fluids, insulating fluids, cement slurries, stimulation fluids, fracturing fluids, the like, or any combination thereof. The treatment fluid can be introduced into the wellbore prior to or after a second treatment fluid. As used herein, a "cement slurry" is a mixture of at least cement and water (i.e., the base fluid) and possibly additives. As used herein, the term "cement" means an initially dry substance that, in the presence of water, acts as a binder to bind other materials together. An example of cement is Portland cement.

Example systems as disclosed herein illustrate the use of a nanocellulose to alter at least one rheological property of a treatment fluid that is introduced into a wellbore. The example systems may comprise a pump coupled to a tubular. The tubular may be disposed in a wellbore or may be a type of transport equipment, for example, a pipeline used to transport hydrocarbon fluids to a downstream location such as a refinery. The pump may be a high-pressure pump or a low-pressure pump. As used herein, the term "high-pressure pump" will refer to a pump that operates at a pressure of about 1000 psi or greater. Suitable high-pressure pumps will be known to one having ordinary skill in the art and may include, but are not limited to, floating piston pumps and positive displacement pumps. In other examples, the pump may be a low-pressure pump. As used herein, the term "low-pressure pump" will refer to a pump that operates at a pressure of about 1000 psi or less. Suitable low-pressure pumps will be known to one having ordinary skill in the art.

In some examples, the systems described herein may further comprise a mixing tank that is upstream of the pump and is the vessel in which the treatment fluid is formulated. In various examples, the pump (e.g., a low-pressure pump, a high-pressure pump, or a combination thereof) may convey the treatment fluid from the mixing tank to the transporting conduit. In other examples, the treatment fluid may be formulated offsite and transported to a worksite, in which case the treatment fluid may be introduced to the transporting conduit via the pump either directly from its shipping container (e.g., a truck, a railcar, a barge, or the like) or from a transport pipeline. In either case, the treatment fluid may be drawn into the pump, elevated to an appropriate pressure, and then introduced into the transporting conduit for delivery downhole or to a downstream location such as a refinery.

In example methods, a nanocellulose may be provided. The cellulose feedstock source may be selected to provide a cellulose capable of being processed into a nanocellulose having a desired property, for example, a desired average aspect ratio. The cellulose may be processed with a processing technique to provide the nanocellulose with the desired property. The nanocellulose may then be added to a treatment fluid where it may alter a rheological property of the treatment fluid, and the treatment fluid may then be introduced into a wellbore.

Figure 1:
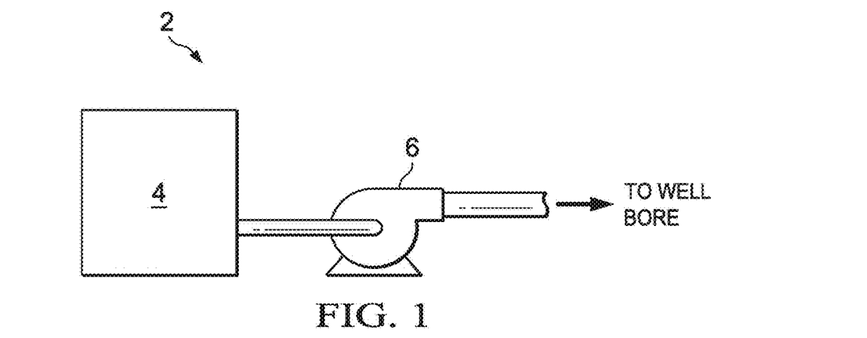
FIG. 1 illustrates a schematic of a system for the preparation and delivery of a treatment fluid comprising a nanocellulose to a wellbore in accordance with the examples disclosed herein.

Referring now to FIG. 1, preparation of a treatment fluid comprising the nanocellulose will now be described in accordance with the examples disclosed herein. FIG. 1 illustrates a system 2 for preparation of a treatment fluid comprising the nanocellulose. The nanocellulose may be added to a treatment fluid and mixed in mixing equipment 4. The nanocellulose may be added manually, or via pumping through a diaphragm pump or the like. Mixing equipment 4 may be any mixer sufficient for mixing the nanocellulose with the treatment fluid or at least one of the components of the treatment fluid in order to provide a treatment fluid with the desired rheological properties. Examples of mixing equipment 4 may include, but are not limited to, a jet mixer, re-circulating mixer, a batch mixer, and the like. In some examples, mixing equipment 4 may be a jet mixer and may continuously mix the treatment fluid as it is pumped to the wellbore. The nanocellulose may be added to mixing equipment 4 first or, alternatively, the treatment fluid may be added to mixing equipment 4 first. In some examples, the treatment fluid may be formulated in mixing equipment 4 such that the components of the treatment fluid, including the nanocellulose, may be added to the mixing equipment 4 in any order and mixed to provide the desired treatment fluid.

After the nanocellulose has been added to the treatment fluid and mixed in mixing equipment 4 to provide a treatment fluid with a desired rheological property and composition, the treatment fluid may be pumped to the wellbore via pumping equipment 6. In some examples, the mixing equipment 4 and the pumping equipment 6 may be disposed on one or more cement trucks as will be apparent to those of ordinary skill in the art. Examples of pumping equipment 6 include, but are not limited to, floating piston pumps, positive displacement pumps, centrifugal pumps, peristaltic pumps, and diaphragm pumps.

Figure 2A:
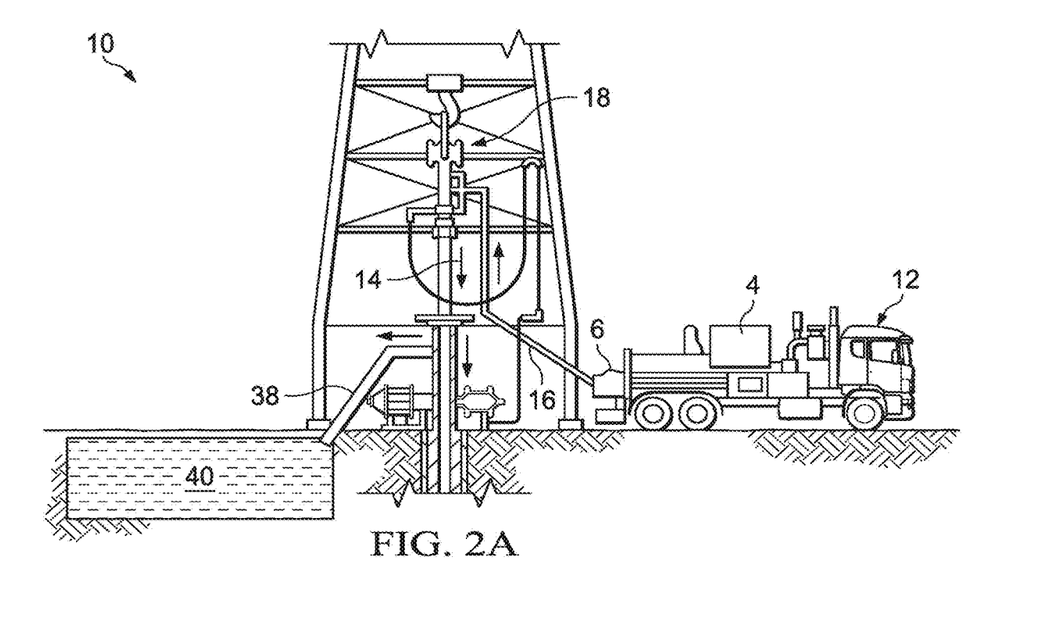
FIG. 2A illustrates a schematic of a system of surface equipment that may be used in the placement of a treatment fluid comprising the nanocellulose in a wellbore in accordance with the examples disclosed herein.
Figure 2B:
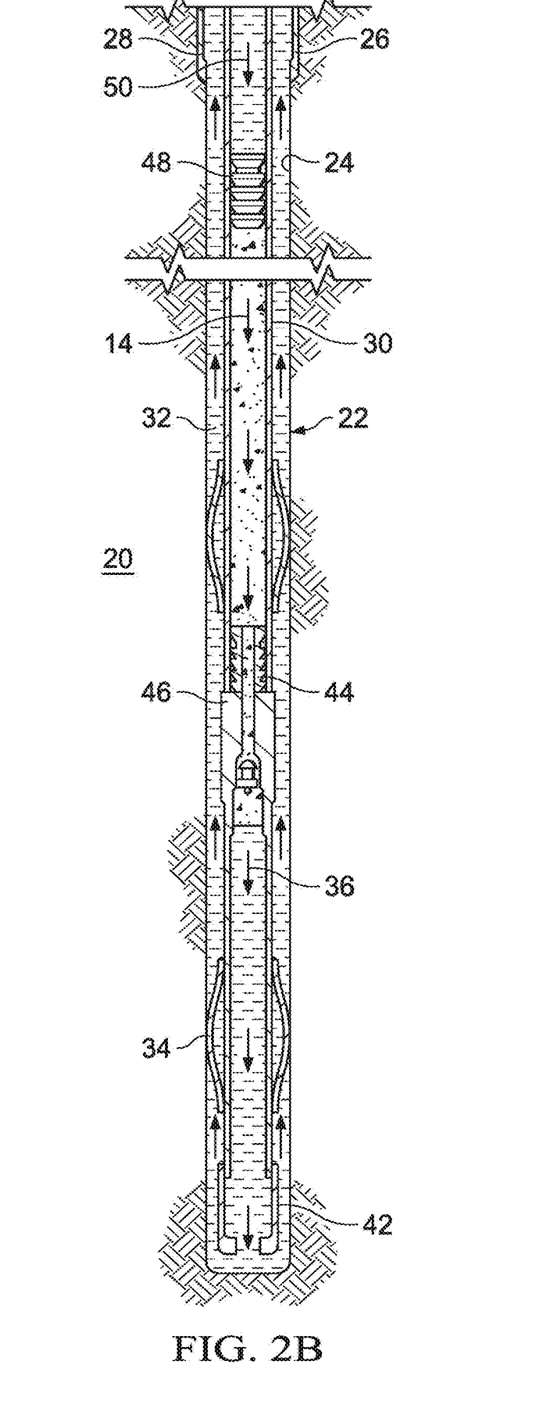
FIG. 2B illustrates a schematic of a system used for the placement of a cement composition comprising the nanocellulose into a wellbore annulus in accordance with the examples disclosed herein.

With reference to FIGS. 2A and 2B, an example technique for placing a treatment fluid comprising the nanocellulose is described. Specifically, the placement of a cement composition comprising the nanocellulose is described. The nanocellulose may be added to the cement composition (i.e., the treatment fluid) as discussed in FIG. 1. FIG. 2A illustrates surface equipment 10 that may be used in placement of a cement composition in accordance with certain examples disclosed herein. It should be noted that while FIG. 2A generally depicts a land-based operation, those skilled in the art will readily recognize that the principles described herein are equally applicable to subsea operations that employ floating or sea-based platforms and rigs without departing from the scope of the disclosure. As illustrated by FIG. 2A, the surface equipment 10 may include a cementing unit 12, which may include one or more cement trucks. The cementing unit 12 may include mixing equipment 4 and pumping equipment 6, as will be apparent to those of ordinary skill in the art. The cementing unit 12 may pump a cement composition 14 through feed pipe 16 and to a cementing head 18, which conveys the cement composition 14 downhole into a wellbore.

Turning now to FIG. 2B, the cement composition 14 may be placed into a subterranean formation 20 in accordance with certain examples. As illustrated, a wellbore 22 may be drilled into the subterranean formation 20. While wellbore 22 is shown extending vertically into the subterranean formation 20, the principles described herein are also applicable to wellbores that extend at an angle through the subterranean formation 20, such as horizontal and slanted wellbores. As illustrated, the wellbore 22 comprises walls 24. A surface casing 26 has been inserted into the wellbore 22. The surface casing 26 may be cemented to the walls 24 of the wellbore 22 by cement sheath 28. In the illustrated embodiment, casing 30 is disposed in the wellbore 22. In some examples, one or more additional conduits (e.g., intermediate casing, production casing, liners, tubing, coiled tubing, jointed tubing, stick pipe, etc.) may also be disposed in the wellbore 22. As illustrated, there is a wellbore annulus 32 formed between the casing 30 and the walls 24 of the wellbore 22 and/or the surface casing 26. One or more centralizers 34 may be attached to the casing 30, for example, to centralize the casing 30 in the wellbore 22 prior to and during the cementing operation.

With continued reference to FIG. 2B, the cement composition 14 may be pumped down the interior of the casing 30. The cement composition 14 may be allowed to flow down the interior of the casing 30 through the casing shoe 42 at the bottom of the casing 30 and up around the casing 30 into the wellbore annulus 32. The cement composition 14 may be allowed to set in the wellbore annulus 32, for example, to form a cement sheath 28 that supports and positions the casing 30 in the wellbore 22. While not illustrated, other techniques may also be utilized for introduction of the cement composition 14. By way of example, reverse circulation techniques may be used that include introducing the cement composition 14 into the subterranean formation 20 by way of the wellbore annulus 32 instead of through the casing 30.

As it is introduced, the cement composition 14 may displace other fluids 36, such as drilling fluids and/or spacer fluids that may be present in the interior of the casing 30 and/or the wellbore annulus 32. In some examples, these displaced other fluids 36 may also be treatment fluids comprising the disclosed nanocellulose. At least a portion of the displaced other fluids 36 may exit the wellbore annulus 32 via a flow line 38 and be deposited, for example, in one or more retention pits 40 (e.g., a mud pit), as shown on FIG. 2A. Referring again to FIG. 2B, a bottom plug 44 may be introduced into the wellbore 22 ahead of the cement composition 14, for example, to separate the cement composition 14 from the other fluids 36 that may be inside the casing 30 prior to cementing. After the bottom plug 44 reaches a landing collar 46, a diaphragm or other suitable device may rupture to allow the cement composition 14 through the bottom plug 44. In FIG. 2B, the bottom plug 44 is illustrated as positioned on the landing collar 46. In the illustrated example, a top plug 48 may be introduced into the wellbore 22 behind the cement composition 14. The top plug 48 may separate the cement composition 14 from a displacement fluid 50 and push the cement composition 14 through the bottom plug 44. When positioned as desired, the cement composition 14 may then be allowed to set. In some examples, the displacement fluid 50 may comprise the disclosed nanocellulose to provide the displacement fluid 50 with a desired property.

Figure 3:
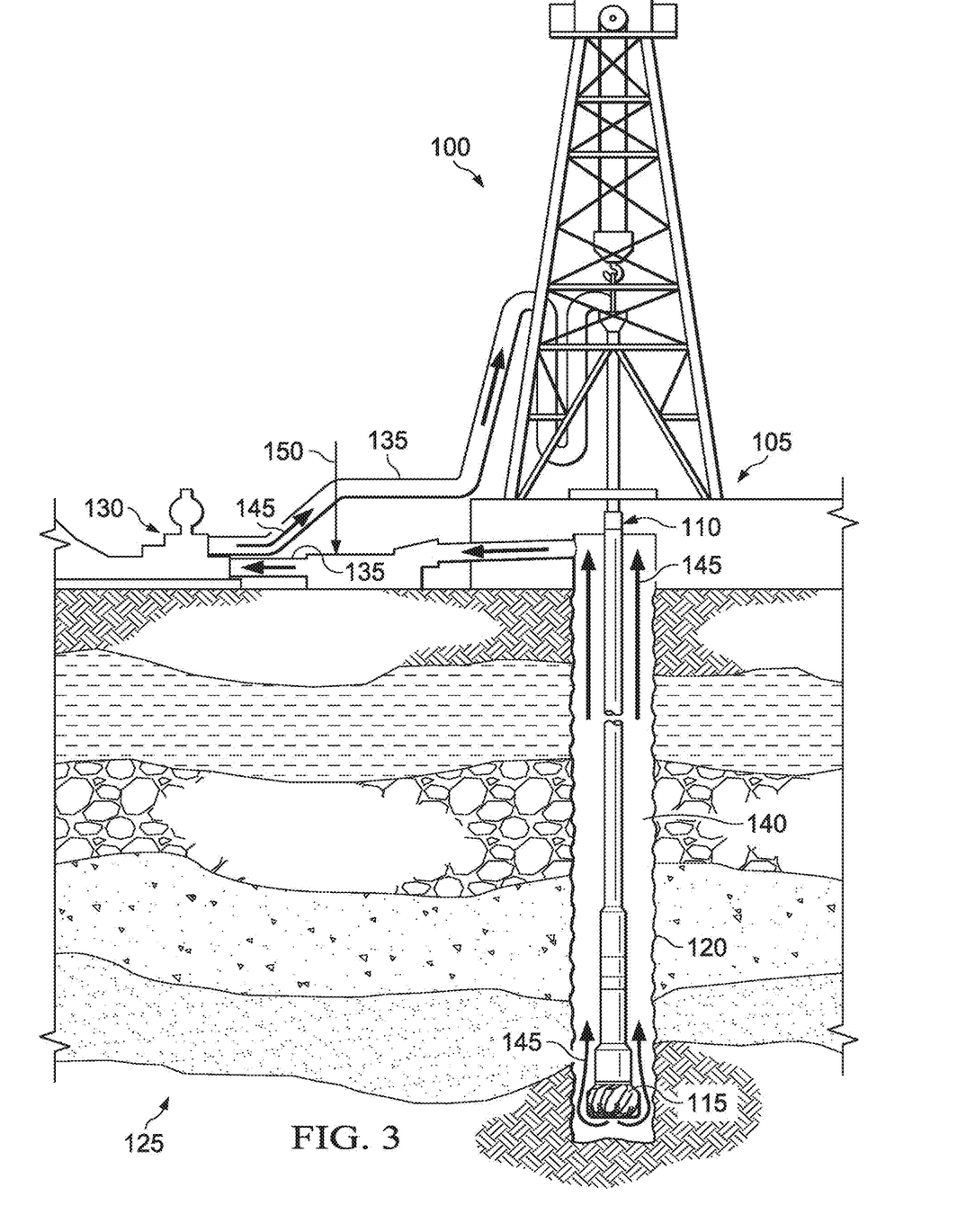
FIG. 3 illustrates a schematic of a system used for the drilling of a wellbore with a drilling fluid comprising the nanocellulose in accordance with the examples disclosed herein.

FIG. 3 is a schematic showing one example of a drilling assembly 100 suitable for drilling with a treatment fluid comprising the nanocellulose, specifically, the drilling of a wellbore 120 with a drilling fluid 145 comprising the nanocellulose. It should be noted that while FIG. 3 generally depicts a land-based drilling assembly, those skilled in the art will readily recognize that the principles described herein are equally applicable to subsea drilling operations that employ floating or sea-based platforms and rigs, without departing from the scope of the disclosure.

The drilling assembly 100 includes a drilling platform 105 coupled to a drill string 110. The drill string 110 may include, but is not limited to, drill pipe and coiled tubing, as generally known to those skilled in the art apart from the particular teachings of this disclosure. A drill bit 115 is attached to the distal end of the drill string 110 and is driven either by a downhole motor and/or via rotation of the drill string 110 from the well surface. As the drill bit 115 rotates, it creates a wellbore 120 that penetrates the subterranean formation 125. The drilling assembly 100 also includes a pump 130 (e.g., a mud pump) that circulates a drilling fluid 145 through a feed pipe 135 to the drill string 110, down the interior of the drill string 110, through one or more orifices in the drill bit 115, and into the annulus 140 between the drill string 110 and walls of the wellbore 120.

The drilling fluid 145 is then circulated back to the surface via annulus 140. At the surface, the recirculated or spent drilling fluid 145 exits the annulus 140 and may be processed and cleaned before being passed to a retention pit. The cleaned drilling fluid 145 may then be reintroduced into the wellbore 120 via pump 130 if desired.

In some examples, the nanocellulose may be added to the drilling fluid 145 via mixing equipment 150 communicably coupled to or otherwise in fluid communication with the retention pit. The mixing equipment 150 may include, but is not limited to, mixers and related mixing equipment known to those skilled in the art. In other examples, however, the nanocellulose may be added to the drilling fluid 145 at any other location in the drilling assembly 100. In at least one example, there could be more than one retention pit (e.g., there could be multiple retention pits in series). Moreover, the retention pit may be representative of one or more fluid storage facilities and/or units where the nanocellulose may be stored until added to the drilling fluid 145.

One skilled in the art would recognize the other equipment suitable for use in conjunction with drilling assembly 100, which may include, but is not limited to, mixers, shakers (e.g., shale shaker), centrifuges, hydrocyclones, separators (including magnetic and electrical separators), desilters, desanders, filters (e.g., diatomaceous earth filters), heat exchangers, and any fluid reclamation equipment. Further, the drilling assembly 100 may include one or more sensors, gauges, pumps, compressors, and the like.

Figure 4:
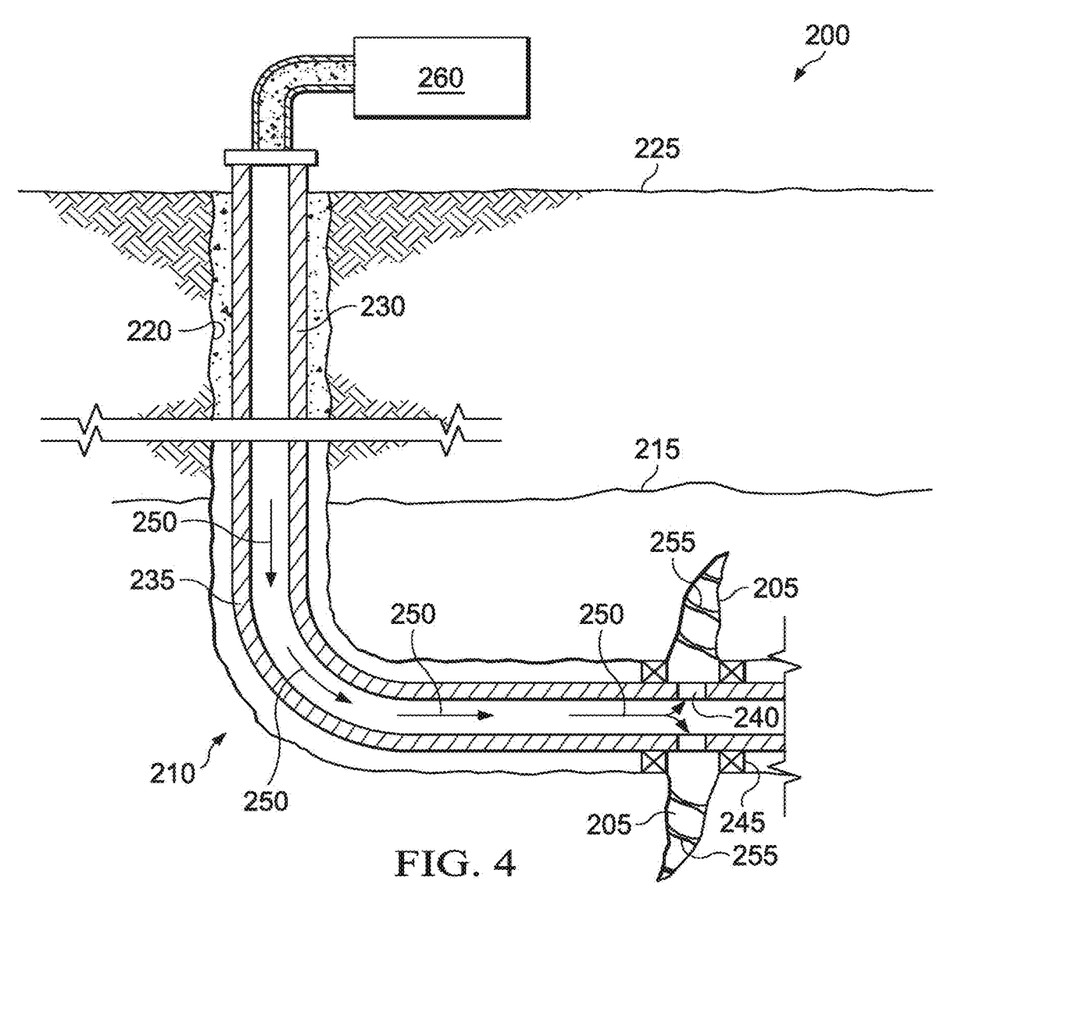
FIG. 4 illustrates a cross-section of a system for propping a fracture with a fracturing fluid comprising the nanocellulose in accordance with the examples disclosed herein.

FIG. 4 illustrates a cross-section of a system 200 for propping a fracture 205 using a treatment fluid 250 comprising the nanocellulose as described herein. As illustrated, a well 210 penetrates a portion of a subterranean formation 215 surrounding a wellbore 220. The wellbore 220 extends from the surface 225. Although shown as vertical deviating to horizontal, the wellbore 220 may include horizontal, vertical, slant, curved, and other types of wellbore geometries and orientations, and the treatment fluid 250 may be applied to a subterranean zone surrounding any portion of the wellbore 220. The wellbore 220 may include a casing 230 that is cemented, uncemented, or otherwise secured to the wall of the wellbore 220. In some examples, the wellbore 220 may be uncased or include uncased sections. Perforations may be formed in the casing 230 to allow the treatment fluid 250 and/or other materials to flow into the subterranean formation 215. In cased wells, perforations may be formed using shape charges, a perforating gun, hydro-jetting, and/or other tools.

The well 210 is shown with a work string 235 descending from the surface 225 into the wellbore 220. A high-pressure pump system 260 is coupled to work string 235 to pump the treatment fluid 250 comprising the nanocellulose into the wellbore 220 as discussed below. The work string 235 may include coiled tubing, jointed pipe, and/or other structures that allow fluid to flow into the wellbore 220. The work string 235 may include flow control devices, bypass valves, ports, and/or other tools or well devices capable of controlling the flow of a fluid from the interior of the work string 235 into the subterranean formation 215. For example, the work string 235 may include ports 240 that are spaced apart from the wall of the wellbore 220 to communicate the treatment fluid 250 into an annulus in the wellbore 220 adjacent to a fracture 205 and between the work string 235 and the wall of the wellbore 220. Alternatively, the work string 235 may include ports 240 directly adjacent to a fracture 205 in the wall of the wellbore 220 to communicate the treatment fluid 250 directly into the fracture 205.

With continued reference to FIG. 4, the work string 235 and/or the wellbore 220 may include one or more sets of packers 245 that seal the annulus between the work string 235 and wellbore 220 to define an interval of the wellbore 220 into which the treatment fluid 250 may be pumped. FIG. 4 illustrates two packers 245, one defining an uphole boundary of the interval and one defining the downhole end of the interval.

Treatment fluid 250 may be introduced into wellbore 220 at a sufficient pressure to create, enhance, and/or enter fracture 205. A portion of the treatment fluid 250 may comprise a nanocellulose as disclosed herein. A portion of the treatment fluid 250 may comprise other additives such as proppant. The nanocellulose may be used to increase the viscosity of the treatment fluid 250 to a degree sufficient to suspend the proppant in the treatment fluid 250. The proppant may be used to prop fracture 205 by forming a proppant pack or pillar-like aggregates within fracture 205 depending upon the propping operation performed. In the illustrated example of FIG. 4, a propping operation has been performed to produce proppant pillar-like aggregates 255 within fracture 205. Treatment fluid 250 may be a proppant-laden fluid, spacer fluid, fracturing fluid, etc. In the illustrated example, an alternating sequence of treatment fluids 250, for example, a spacer fluid and a proppant-laden fluid, may be introduced into the wellbore 220 to produce the pillar-like aggregates 255. Completion of the fracturing and propping operation may comprise allowing the liquid portion of the treatment fluids 250 to flow out of the fracture 205. The formed pillar-like aggregates 255 may remain in the fracture 205. Hydrocarbons may freely flow out of propped fracture 205 via the channels opened between the pillar-like aggregates 255 when the liquid portions of the treatment fluids 250 are flowed out of the fracture 205.

It should be clearly understood that the examples illustrated by FIGS. 1-4 are merely general applications of the principles of this disclosure in practice, and a wide variety of other examples are possible. Therefore, the scope of this disclosure is not limited in any manner to the details of FIGS. 1-4 as described herein.

It is also to be recognized that the disclosed methods and systems may also directly or indirectly affect the various downhole equipment and tools that may contact the nanocellulose or treatment fluids comprising the nanocellulose. Such equipment and tools may include, but are not limited to, wellbore casing, wellbore liner, completion string, insert strings, drill string, coiled tubing, slickline, wireline, drill pipe, drill collars, mud motors, downhole motors and/or pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like. Any of these components may be included in the systems generally described above and depicted in FIGS. 1-4.

Provided are methods of controlling the rheology of a treatment fluid in accordance with the disclosure and the illustrated FIGS. An example method comprises selecting a cellulose feedstock source to provide a cellulose capable of being processed into a nanocellulose having an average desired aspect ratio, and processing the cellulose with a cellulose processing technique to provide the nanocellulose with the average desired aspect ratio. The method further comprises adding the nanocellulose to the treatment fluid; wherein the nanocellulose alters a rheological property of the treatment fluid to provide an altered treatment fluid, and introducing the altered treatment fluid into a wellbore.

Additionally or alternatively, the method may include one or more of the following features individually or in combination. The nanocellulose may comprise a cellulose nanocrystal. The nanocellulose may comprise a cellulose nanofibril. The cellulose feedstock source may be selected from the group consisting of cotton, wood, wood pulp, ramie, sisal, valonia, tunicates, *Enterobacter, Acetobacter, Achromobacter, Agrobacterium*, Alacaligenes, *Azotobacter, Komagataeibacter, Pseudomonas, Rhizobium, Sarcina, Gluconacetobacter*, and any combinations thereof. The cellulose processing technique may be selected from the group consisting of cryo-crushing, cryo-milling, grinding, fluid homogenization, microfluidization, aqueous counter-collision, shearing, contacting with an acid, contacting with a base, contacting with an oxidizing agent, contacting with an enzyme, and any combinations thereof. The rheological property may be selected from the group consisting of viscosity, viscoelasticity, yield point, consistency factor, flow index, gelation, and any combinations thereof. The rheological property of the treatment fluid is viscosity, and the viscosity of the treatment fluid is altered such that the viscosity of the altered treatment fluid may be decreased relative to the treatment fluid. The rheological property of the treatment fluid is viscosity, and the viscosity of the treatment fluid is altered such that the viscosity of the altered treatment fluid may be increased relative to the treatment fluid. The treatment fluid may be selected from the group consisting of drilling fluids, drill-in fluids, packer fluids, completion fluids, spacer fluids, workover fluids, insulating fluids, cement slurries, stimulation fluids, fracturing fluids, and any combinations thereof.

Provided are methods of controlling the rheology of a treatment fluid in accordance with the disclosure and the illustrated FIGS. An example method comprises determining an average aspect ratio for cellulose obtained from at least two cellulose feedstock sources; and processing the cellulose from one of the cellulose feedstock sources with a cellulose processing technique to provide a nanocellulose; wherein the processing further comprises altering the surface charge of the nanocellulose. The method further comprises adding the nanocellulose to the treatment fluid; wherein the nanocellulose alters a rheological property of the treatment fluid to provide an altered treatment fluid, and introducing the altered treatment fluid into a wellbore.

Additionally or alternatively, the method may include one or more of the following features individually or in combination. The nanocellulose may comprise a cellulose nanocrystal. The nanocellulose may comprise a cellulose nanofibril. The cellulose feedstock source may be selected from the group consisting of cotton, wood, wood pulp, ramie, sisal, valonia, tunicates, *Enterobacter, Acetobacter, Achromobacter, Agrobacterium*, Alacaligenes, *Azotobacter, Komagataeibacter, Pseudomonas, Rhizobium, Sarcina, Gluconacetobacter*, and any combinations thereof. The cellulose processing technique may be selected from the group consisting of cryo-crushing, cryo-milling, grinding, fluid homogenization, microfluidization, aqueous counter-collision, shearing, contacting with an acid, contacting with a base, contacting with an oxidizing agent, contacting with an enzyme, and any combinations thereof. The rheological property may be selected from the group consisting of viscosity, viscoelasticity, yield point, consistency factor, flow index, gelation, and any combinations thereof. The rheological property of the treatment fluid is viscosity, and the viscosity of the treatment fluid is altered such that the viscosity of the altered treatment fluid may be decreased relative to the treatment fluid. The rheological property of the treatment fluid is viscosity, and the viscosity of the treatment fluid is altered such that the viscosity of the altered treatment fluid may be increased relative to the treatment fluid. The treatment fluid may be selected from the group consisting of drilling fluids, drill-in fluids, packer fluids, completion fluids, spacer fluids, workover fluids, insulating fluids, cement slurries, stimulation fluids, fracturing fluids, and any combinations thereof.

Provided are systems for controlling the rheology of a treatment fluid in accordance with the disclosure and the illustrated FIGS. An example system comprises at least two cellulose feedstock sources comprising cellulose having different average aspect ratios; the treatment fluid comprising nanocellulose produced from cellulose from one of the cellulose feedstock sources with a cellulose processing technique; pumping equipment capable of pumping the treatment fluid; and mixing equipment capable of mixing the nanocellulose with the treatment fluid.

Additionally or alternatively, the system may include one or more of the following features individually or in combination. The nanocellulose may comprise a cellulose nanocrystal. The nanocellulose may comprise a cellulose nanofibril. The cellulose feedstock source may be selected from the group consisting of cotton, wood, wood pulp, ramie, sisal, valonia, tunicates, *Enterobacter, Acetobacter, Achromobacter, Agrobacterium*, Alacaligenes, *Azotobacter, Komagataeibacter, Pseudomonas, Rhizobium, Sarcina, Gluconacetobacter*, and any combinations thereof. The cellulose processing technique may be selected from the group consisting of cryo-crushing, cryo-milling, grinding, fluid homogenization, microfluidization, aqueous counter-collision, shearing, contacting with an acid, contacting with a base, contacting with an oxidizing agent, contacting with an enzyme, and any combinations thereof. The rheological property may be selected from the group consisting of viscosity, viscoelasticity, yield point, consistency factor, flow index, gelation, and any combinations thereof. The rheological property of the treatment fluid is viscosity, and the viscosity of the treatment fluid is altered such that the viscosity of the altered treatment fluid may be decreased relative to the treatment fluid. The rheological property of the treatment fluid is viscosity, and the viscosity of the treatment fluid is altered such that the viscosity of the altered treatment fluid may be increased relative to the treatment fluid. The treatment fluid may be selected from the group consisting of drilling fluids, drill-in fluids, packer fluids, completion fluids, spacer fluids, workover fluids, insulating fluids, cement slurries, stimulation fluids, fracturing fluids, and any combinations thereof.

EXAMPLES

The present disclosure may be better understood by reference to the following examples, which are offered by way of illustration. The present disclosure is not limited to the examples provided herein.

Example 1

Figure 5A:
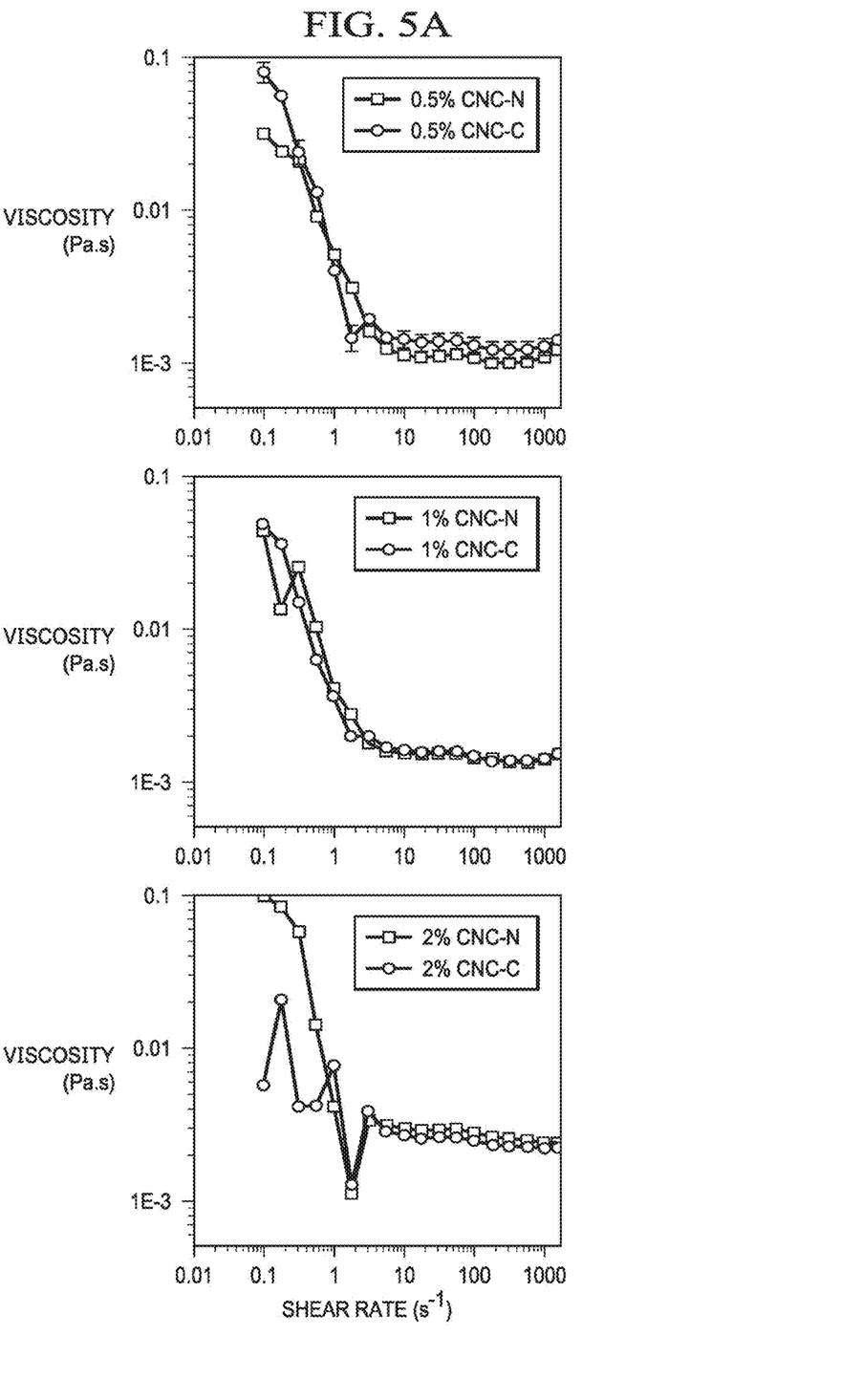
FIG. 5A is a graph illustrating a comparative experiment measuring the rheological effect that different nanocellulose processing techniques produce in a sample treatment fluid in accordance with the examples disclosed herein.
Figure 5B:
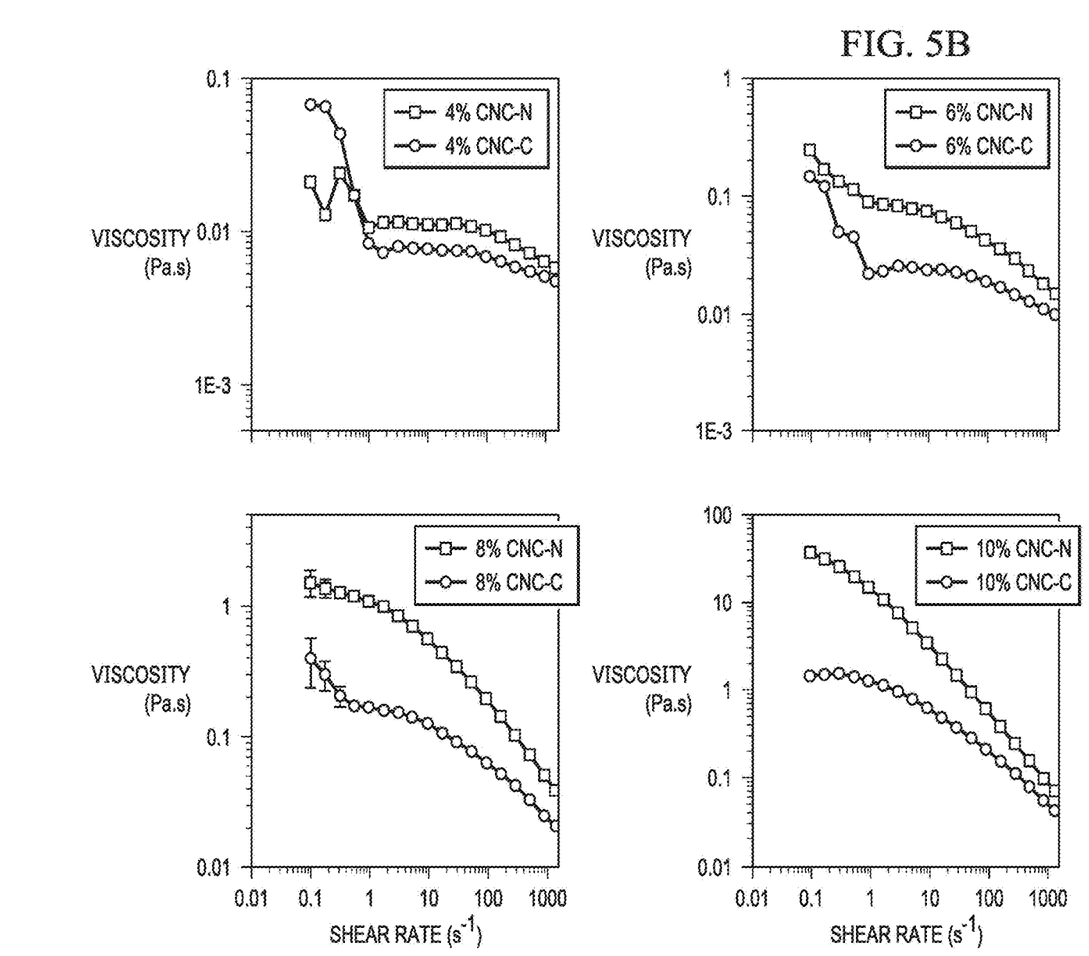
FIG. 5B is a graph continuing the illustration of the comparative experiment of 5A in accordance with the examples disclosed herein.

Example 1 illustrates a comparative experiment to test if different processing techniques may provide nanocellulose capable of producing different rheological profiles for the same treatment fluid. Cellulose from a single feedstock was obtained and CNC were produced via acid hydrolysis and shearing of the cellulose. The CNC were then split into two sample groups, CNC—N and CNC—C. The CNC—C group was then subjected to two 5-minute cycles of milling in liquid nitrogen. Each sample group was then added to an identical treatment fluid at the same concentration and subjected to increasing shear. At low concentrations of 2% of less, there is little change in the viscosity of the sample groups. This result is illustrated in FIG. 5A. However, at increasing concentrations of 4% or greater, the two sample groups began to diverge. Specifically, the CNC—C group that was subjected to the cryo-milling produced a treatment fluid having less viscosity at low shear. This result is illustrated in FIG. 5B.

One or more illustrative examples incorporating the examples disclosed herein are presented. Not all features of a physical implementation are described or shown in this application for the sake of clarity. Therefore, the disclosed systems and methods are well adapted to attain the ends and advantages mentioned, as well as those that are inherent therein. The particular examples disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown other than as described in the claims below. It is therefore evident that the particular illustrative examples disclosed above may be altered, combined, or modified, and all such variations are considered within the scope of the present disclosure. The systems and methods illustratively disclosed herein may suitably be practiced in the absence of any element that is not specifically disclosed herein and/or any optional element disclosed herein.

Although the present disclosure and its advantages have been described in detail, it should be understood that various changes, substitutions and alterations can be made herein without departing from the spirit and scope of the disclosure as defined by the following claims.

What is claimed is:

1. A method of controlling the rheology of a treatment fluid, the method comprising:
    determining an average desired aspect ratio,
    selecting a cellulose feedstock source to provide a cellulose to be processed into a nanocellulose having the average desired aspect ratio, wherein the cellulose feedstock source is selected from the group consisting of cotton, ramie, sisal, valonia, tunicates, *Enterobacter, Acetobacter, Achromobacter, Agrobacterium, Alacaligenes, Azotobacter, Kmagataeibacter, Psuedomonas, Rhizobium, Sarcina, Gluconacetobacter*, and any combinations thereof,
    processing the cellulose with a cellulose processing technique to provide the nanocellulose with the average desired aspect ratio, wherein the cellulose processing technique is selected from the group consisting of cryo-crushing, cryo-milling, grinding, fluid homogenization, microfluidization, aqueous counter-collision, shearing, contacting with an acid, contacting with a base, contacting with an oxidizing agent, contacting with an enzyme, and any combinations thereof,
    adding the nanocellulose to the treatment fluid; wherein the nanocellulose alters a rheological property of the treatment fluid to provide an altered treatment fluid, and
    introducing the altered treatment fluid into a wellbore.

2. The method of claim 1, wherein the nanocellulose comprises a cellulose nanocrystal.

3. The method of claim 1, wherein the nanocellulose comprises a cellulose nanofibril.

4. The method of claim 1, wherein the rheological property is selected from the group consisting of viscosity, viscoelasticity, yield point, consistency factor, flow index, gelation, and any combinations thereof.

5. The method of claim 1, wherein the rheological property of the treatment fluid is viscosity, and the viscosity of the treatment fluid is altered such that the viscosity of the altered treatment fluid is decreased relative to the treatment fluid.

6. The method of claim 1, wherein the rheological property of the treatment fluid is viscosity, and the viscosity of the treatment fluid is altered such that the viscosity of the altered treatment fluid is increased relative to the treatment fluid.

7. The method of claim 1, wherein the treatment fluid is selected from the group consisting of drilling fluids, drill-in fluids, packer fluids, completion fluids, spacer fluids, workover fluids, insulating fluids, cement slurries, stimulation fluids, fracturing fluids, and any combinations thereof.

8. The method of claim 1, wherein the concentration of the nanocellulose in the treatment fluid is in a range from 0.1% (V/V) to 20% (V/V).

9. A method of controlling the rheology of a treatment fluid, the method comprising:
    determining an average aspect ratio for cellulose obtained from at least two cellulose feedstock sources;
    selecting a cellulose feedstock source to provide a cellulose to be processed into a nanocellulose having the average desired aspect ratio, wherein the cellulose feedstock source is selected from the group consisting of cotton, ramie, sisal, valonia, tunicates, *Enterobacter, Acetobacter, Achromobacter, Agrobacterium, Alacali-*

*genes, Azotobacter, Komagataeibacter, Pseudomonas, Rhizobium, Sarcina, Gluconacetobacter*, and any combinations thereof, processing the cellulose from one of the cellulose feedstock sources with a cellulose processing technique to provide a nanocellulose; wherein the processing further comprises altering the surface charge of the nanocellulose;

adding the nanocellulose to the treatment fluid; wherein the nanocellulose alters a rheological property of the treatment fluid to provide an altered treatment fluid, and introducing the altered treatment fluid into a wellbore.

10. The method of claim 9, wherein the nanocellulose comprises a cellulose nanocrystal.

11. The method of claim 9, wherein the nanocellulose comprises a cellulose nanofibril.

12. The method of claim 9, wherein the cellulose processing technique is selected from the group consisting of cryo-crushing, cryo-milling, grinding, fluid homogenization, microfluidization, aqueous counter-collision, shearing, contacting with an acid, contacting with a base, contacting with an oxidizing agent, contacting with an enzyme, and any combinations thereof.

13. The method of claim 9, wherein the rheological property is selected from the group consisting of viscosity, viscoelasticity, yield point, consistency factor, flow index, gelation, and any combinations thereof.

14. The method of claim 9, wherein the rheological property of the treatment fluid is viscosity, and the viscosity of the treatment fluid is altered such that the viscosity of the altered treatment fluid is increased relative to the treatment fluid.

15. The method of claim 9, wherein the treatment fluid is selected from the group consisting of drilling fluids, drill-in fluids, packer fluids, completion fluids, spacer fluids, workover fluids, insulating fluids, cement slurries, stimulation fluids, fracturing fluids, and any combinations thereof.

16. The method of claim 9, wherein the concentration of the nanocellulose in the treatment fluid is in a range from 0.1% (V/V) to 20% (V/V).

17. The method of claim 9, wherein the altering the surface charge of the nanocellulose comprises grafting a polymer onto the nanocellulose.

* * * * *